(12) United States Patent
Wylezinski (10) Patent No.: US 9,834,264 B2
(45) Date of Patent: Dec. 5, 2017

(54) UPPER COUPLER ASSEMBLY

(71) Applicant: Wabash National, L.P., Lafayette, IN (US)

(72) Inventor: Andrzej Wylezinski, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 30 days.

(21) Appl. No.: 14/975,012

(22) Filed: Dec. 18, 2015

(65) Prior Publication Data

US 2016/0185403 A1 Jun. 30, 2016

Related U.S. Application Data

(60) Provisional application No. 62/097,308, filed on Dec. 29, 2014.

(51) Int. Cl.
*B62D 53/06* (2006.01)
*B62D 21/20* (2006.01)
*B62D 53/08* (2006.01)

(52) U.S. Cl.
CPC .............. *B62D 53/06* (2013.01); *B62D 21/20* (2013.01); *B62D 53/0842* (2013.01)

(58) Field of Classification Search
CPC .... B62D 53/06; B62D 53/0842; B62D 21/20; Y10T 29/49888
See application file for complete search history.

(56) References Cited

U.S. PATENT DOCUMENTS

| | | | | |
|---|---|---|---|---|
| 3,771,816 A | * | 11/1973 | Hord, Jr. | B62D 53/0842 280/433 |
| 3,990,720 A | * | 11/1976 | Schwartz | B62D 53/0842 280/433 |
| 4,254,967 A | * | 3/1981 | Scanlon | B62D 53/0842 280/433 |
| 4,546,994 A | * | 10/1985 | Taylor | B60D 1/07 280/416.1 |
| 6,623,868 B1 | | 9/2003 | Shindou et al. | |
| 6,913,276 B1 | * | 7/2005 | Bauder | B60D 1/50 280/483 |
| 7,931,328 B2 | | 4/2011 | Lewallen et al. | |
| 8,485,544 B2 | * | 7/2013 | McNeil | B62D 53/0842 280/423.1 |
| 8,943,671 B2 | | 2/2015 | McNeil et al. | |
| 2007/0069500 A1 | * | 3/2007 | Bloodworth | B62D 53/0842 280/433 |
| 2007/0235980 A1 | * | 10/2007 | Crawley | B62D 53/0842 280/435 |
| 2009/0322058 A1 | * | 12/2009 | Shannon | B60S 9/04 280/433 |
| 2010/0096837 A1 | * | 4/2010 | Ehrlich | B60D 1/015 280/507 |

(Continued)

*Primary Examiner* — Kevin Hurley
*Assistant Examiner* — Gabriela C Craciun
(74) *Attorney, Agent, or Firm* — Quarles & Brady LLP (57) ABSTRACT

An upper coupler assembly for use with a trailer includes an apron assembly and a grid assembly coupled with the apron assembly. The apron assembly is arranged to engage a coupling of a vehicle to cause the coupling to be aligned with the grid assembly when the upper coupler is being coupled with the vehicle. The grid assembly couples the upper coupler assembly with the coupling of the vehicle.

20 Claims, 8 Drawing Sheets

(56) References Cited

U.S. PATENT DOCUMENTS

| | | | |
|---|---|---|---|
| 2010/0264624 A1* | 10/2010 | McNeil | B62D 53/0842 |
| | | | 280/433 |
| 2013/0069340 A1* | 3/2013 | Goedken | B62D 53/0842 |
| | | | 280/433 |
| 2014/0339790 A1* | 11/2014 | Terpsma | B60D 1/015 |
| | | | 280/433 |
| 2014/0375019 A1* | 12/2014 | Bermes | B60D 1/48 |
| | | | 280/423.1 |
| 2015/0224835 A1* | 8/2015 | Ehrlich | B62D 53/0842 |
| | | | 280/423.1 |

* cited by examiner

UPPER COUPLER ASSEMBLY

CROSS REFERENCE TO RELATED APPLICATIONS

This application claims priority to and the benefit of U.S. Provisional Patent Application No. 62/097,308, filed 29 Dec. 2014, the disclosure of which is now expressly incorporated herein by reference.

FIELD OF THE DISCLOSURE

The present disclosure relates generally to a coupler assembly used to connect together trailers and vehicles, and more specifically to an upper coupler assembly.

BACKGROUND

Upper coupler assemblies are used to connect trailers to vehicles, such as semi-tractors, trucks, automobiles, or railway cars, for movement of the trailer. Such cargo trailers may include for example semi-trailers, van-type trailers, flatbed or platform type trailers, container chassis, and cargo containers.

Equipment weight savings to components of the trailer such as, for example, the upper coupler assembly may improve the efficiency of the trailer and vehicle, lower the operational cost of the trailer and vehicle, allow vehicles to produce less air pollution, and reduce the fabrication cost of the components. In particular, reducing the weight of the upper coupler assembly may reduce damage to the trailer and vehicle overtime caused by wear and, thus, may reduce the cost of maintenance over the lifetime of the trailer and vehicle. Reducing the weight may increase the payload of the trailer and allow the trailer to transport a larger weight of goods over the lifetime of the trailer and vehicle.

Accordingly, there remains a need for further contributions in this area of technology, including contributions that reduce complexity, cost, and weight of applications.

SUMMARY

The present disclosure may comprise one or more of the following features recited in the attached claims and combinations thereof, and/or one or more of the following features and combination thereof.

Various illustrative embodiments of an upper coupler assembly are provided. In one aspect of the disclosure, an illustrative upper coupler assembly is disclosed. Other embodiments include apparatuses, systems, devices, hardware, methods, and combinations for reducing a weight of trailers. Further embodiments, forms, features, aspects, benefits, and advantages of the present application shall become apparent from the description and figures provided herewith.

In one aspect of the disclosure an upper coupler assembly includes an apron assembly. The apron assembly includes a generally horizontal bottom plate configured to engage a coupling of a vehicle, a floor plate spaced apart from the bottom plate, and a plurality of dividers coupled with the bottom plate and coupled with the floor plate to support the floor plate above the bottom plate. Each of the plurality of dividers includes an upright sidewall extending away from the bottom plate toward the floor plate. Each upright sidewall includes a web section, a scalloped section, and a support section extending between the web section and the scalloped section. The dividers are positioned to cause the web sections to be aligned with one another along a straight path. The support sections of the plurality of dividers have varying lengths to cause the scalloped sections of the dividers to be arranged along a curved path.

Illustratively, each scalloped section includes a generally vertical upper surface, a generally vertical lower surface, and a curved scalloped surface extending between the upper surface and the lower surface. Illustratively, the curved scalloped surface has a constant radius of curvature. In some embodiments, the radius of the curved scalloped surface is between about one inch and about five inches.

Illustratively, the support section is coupled with the bottom plate. The scalloped section is engaged with the bottom plate without being directly coupled with the bottom plate.

Illustratively, each support section is formed to include at least one oval divider aperture that extends through the support section. The divider apertures are formed in the dividers to cause the oval divider apertures to be aligned with one another.

Illustratively, the upper coupler assembly further includes a frame having a front plate. The web section of each upright sidewall is coupled to the front plate of the frame.

According to another aspect of the disclosure, an upper coupler assembly includes an apron assembly. The apron assembly includes a bottom plate, a floor plate spaced apart from the bottom plate, and a plurality of dividers coupled with the bottom plate and coupled with the floor plate. Each of the plurality of dividers includes an upright sidewall extending away from the bottom plate toward the floor plate. Each upright sidewall includes a first end and a second end spaced apart from the first end. The first ends of the dividers are aligned with one another along a straight path. The dividers have varying lengths to cause the second ends of the dividers to be arranged along a curved path.

Illustratively, the plurality of dividers includes a pair of first dividers having a first length, a pair of second dividers having a second length greater than the first length, and a pair of third dividers having a third length greater than the second length. Illustratively, the pair of second dividers is located between the pair of third dividers and the pair of first dividers is located between the pair of second dividers.

Illustratively, the curved path has a constant radius of curvature. In some embodiments, the curved path has a radius between about two feet and about six feet.

Illustratively, the floor plate includes a lower surface facing the dividers, an upper surface spaced apart from the lower surface, and a plurality of sidewalls extending between the upper surface and the lower surface to form a plurality of weld apertures. Each of the weld apertures is aligned with a corresponding one of the dividers. Illustratively, each weld aperture is one of an oval, elliptical, or circular shape.

Illustratively, each divider includes the upright sidewall coupled to the bottom plate and an upper platform extending away generally perpendicularly from the upright sidewall. The upper coupler assembly further includes weld material located in each of the weld apertures to form fillet welds between the floor plate and the upper platform of the dividers to couple the floor plate with the plurality of dividers.

According to another aspect of the disclosure, an upper coupler assembly includes an apron assembly and a grid assembly. The apron assembly includes a generally horizontal bottom plate, a floor plate spaced apart from the bottom plate, and a plurality of dividers coupled with the bottom plate and coupled with the floor plate to support the floor plate above the bottom plate. The grid assembly includes a grid plate, a cover assembly coupled to the grid plate, a kingpin assembly, and a plurality of ribs. The cover assembly includes a U-shaped front cross-member located toward the apron assembly, a U-shaped rear cross-member spaced apart from the U-shaped front cross-member to define a main channel between the U-shaped front cross-member and the U-shaped rear cross-member, and a main panel extending between the U-shaped front cross-member and the U-shaped rear cross-member to close the main channel. The kingpin assembly is positioned in the main channel and coupled to the grid plate. The plurality of ribs is positioned in the main channel and each rib extends between the U-shaped front cross-member and the U-shaped rear cross-member.

Illustratively, the kingpin assembly includes a platform, a kingpin spool extending downwardly from the platform through the grid plate, and a downwardly-opening reinforcement channel support coupled to the platform. The reinforcement channel support including a first side arm coupled to the platform along a length of the reinforcement channel support, a second side arm coupled to the platform along the length of the reinforcement channel support, a first end coupled to one of the ribs positioned in the main channel, and a second end spaced apart from the first end along the length of the reinforcement channel support and coupled to one of the ribs positioned in the main channel support.

Illustratively, each rib is formed to include a rib aperture that extends through the rib. Each rib aperture is formed in a midsection of each rib to cause the rib apertures to be aligned with one another.

Illustratively, the grid plate includes a plate body and a joggled lip. The joggled lip extends away from the plate body toward the bottom plate of the apron assembly. The joggled lip overlaps the bottom plate of the apron assembly to cause the plate body to be generally aligned horizontally with the bottom plate of the apron assembly.

Illustratively, each of the dividers includes an upright sidewall extending away from the bottom plate toward the floor plate. Each upright sidewall includes a first end and a second end spaced apart from the first end. The first ends of the dividers are aligned with one another along a straight path. The dividers have varying lengths to cause the second ends of the dividers to be arranged along a curved path.

In another aspect of the disclosure, an upper coupler assembly includes an apron assembly including a bottom plate, a floor plate spaced apart from the bottom plate, and a plurality of dividers coupled with the bottom plate and coupled with the floor plate. The dividers have varying lengths. The varying length dividers are arranged along a curved path.

Illustratively, the dividers include an upright sidewall and an upper platform coupled with and extending away from the upright sidewall. Illustratively, the upright sidewalls include a web section, a scalloped section, and a support section extending therebetween.

Illustratively, the support section is formed to include at least one divider aperture that extends through the support section. Illustratively, the divider aperture is elliptical. Illustratively, the divider apertures are aligned.

Illustratively, the scalloped section includes an upper surface, a lower surface, and a scalloped surface extending between the upper surface and the lower surface. Illustratively, the scalloped surfaces have a constant radius of curvature.

Illustratively, the radius of each scalloped surface is between about 1 inch and about 5 inches. Illustratively, the radius of each scalloped surface is about 2 inches.

Illustratively, the support section is coupled with the bottom plate and the scalloped section is engaged with but not coupled with the bottom plate. Illustratively, the floor plate is formed to include a plurality of weld apertures.

Illustratively, the weld apertures are aligned with the upper platforms of the dividers. Illustratively, the floor plate includes an upper surface, a lower surface spaced apart from the upper surface, and a plurality of sidewalls extending between the upper surface and the lower surface to form a plurality of weld apertures.

Illustratively, the weld apertures are elliptical. In some embodiments, the weld apertures are circular. Illustratively, a weld material is located in the weld aperture to couple the floor plate with the upper platform included in the divider.

Illustratively, the plurality of dividers includes first dividers having a first length, second dividers having a second length greater than the first length, and third dividers having a third length greater than the first and second lengths. Illustratively, the third dividers are spaced apart from the first dividers and the second dividers are located between the first and third dividers.

Illustratively, the first dividers, the second, dividers, and the third dividers are arranged along the curved path. Illustratively, the curved path has a constant radius. Illustratively, the radius of the curved path is about 5 feet.

Illustratively, the upper coupler assembly further comprises a grid assembly. Illustratively, the grid assembly includes a grid plate, a plurality of ribs, a kingpin assembly, and a cover assembly.

Illustratively, the grid plate includes a plate body and a joggled lip that extends along the plate body and upwardly away from the plate body. Illustratively, the joggled lip overlaps the bottom plate of the apron assembly.

Illustratively, the cover assembly includes a front cross-member, a rear cross-member spaced apart from the front cross-member to form a main channel therebetween, and a main plate that extends between the front cross-member and the rear cross-member to close the main channel. Illustratively, the ribs are positioned in the main channel and extend between the front cross-member and the rear cross-member. Illustratively, each rib is formed to include a rib aperture.

Illustratively, the kingpin assembly includes a kingpin coupled with the coupler grid plate. Illustratively, the trailer coupler assembly further comprises drain holes formed in the grid plate and located in the main channel.

According to another aspect of the present disclosure, a method of making a vehicle coupler assembly comprising assembling together a coupler assembly is disclosed. Illustratively, the coupler assembly comprises an apron assembly and a grid assembly coupled with the apron assembly.

Illustratively, the apron assembly includes a bottom plate, the grid assembly includes a grid plate that includes a joggled lip, and the joggled lip overlaps the apron assembly. Illustratively, the apron assembly further includes a plurality of varying length dividers and the dividers are coupled with the bottom plate along a curved path.

Illustratively, the apron assembly further includes a floor plate formed to include a plurality of elliptical weld apertures. A weld material is welded into the weld apertures to weld the floor plate with the dividers.

In some embodiments, the method further comprises the step of applying a coating to a selected area of the coupler assembly. In some embodiments, the coating comprises a galvanizing coating.

In some embodiments, the coating is applied at a station positioned in-line of an upper coupler manufacturing line. In some embodiments, the coating does not alter the material properties of the coated material. In some embodiments, the coating is applied using a thermal spray system.

These and other features of the present disclosure will become more apparent from the following description of the illustrative embodiments.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

For the purposes of promoting an understanding of the principles of the invention, reference will now be made to a number of illustrative embodiments shown in the attached drawings and specific language will be used to describe the same. While the concepts of this disclosure are described in relation to an upper coupler assembly for use in connecting a trailer to a semi-tractor or a railway car, it will be understood that they are equally applicable to other trailers and upper coupler assemblies generally, and more specifically to upper coupler assemblies used with conventional box, van, or flatbed type trailers, examples of which include, but should not be limited to, straight truck bodies, small personal and/or commercial trailers and the like. Further, the concepts of this disclosure are similarly applicable for use with any vehicle underbody or undercarriage, for any type of vehicle, in applications where it is desirable to reduce weight.

Figure 1:
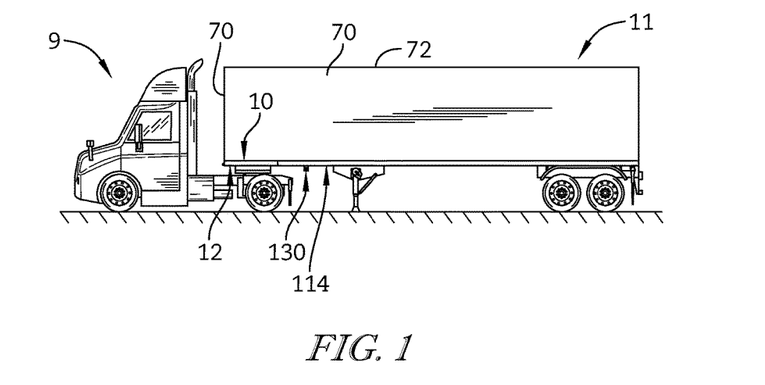
FIG. 1 is a side elevation view of a semi-trailer having an upper coupler assembly employing features of the present disclosure.

FIG. 1 depicts a cargo vehicle or trailer 11 which includes an illustrative upper coupler assembly 10 in a forward section of the trailer 11. The upper coupler assembly 10 is arranged to couple the trailer 11 with a vehicle such as, for example a towing truck 9 to transport cargo stored within the trailer 11. The upper coupler assembly 10 provides weight savings over existing upper coupler assembly designs. In some embodiments, the upper coupler assembly 10 provides about a twenty-five percent weight saving.

Figure 2:
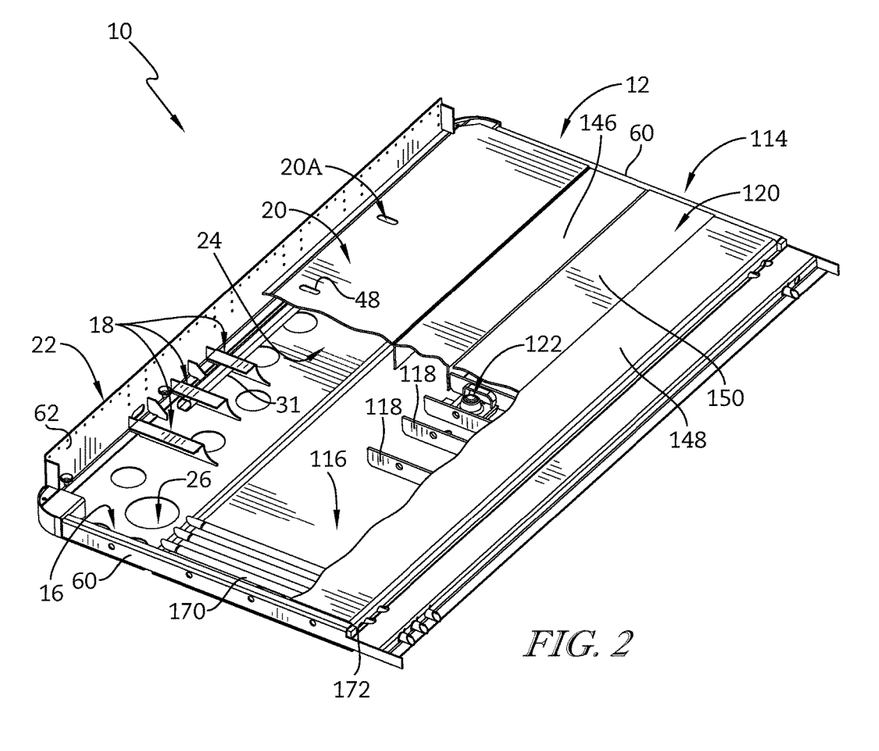
FIG. 2 is a cut-away view of the upper coupler assembly showing that the upper coupler assembly includes an apron assembly and a grid assembly coupled with the apron assembly.

The upper coupler assembly 10 illustratively comprises an apron assembly 12 and a grid assembly 114 as shown in FIG. 2. The apron assembly 12 is arranged to strike a fifth wheel coupling to cause the fifth wheel coupling to be aligned with a kingpin 130 included in the grid assembly 114 when the trailer 11 is being coupled with the towing truck. The grid assembly 114 is coupled with the apron assembly 12 and includes the kingpin 130 that pivotably couples the upper coupler assembly 10 with the fifth wheel coupling.

Figure 3:
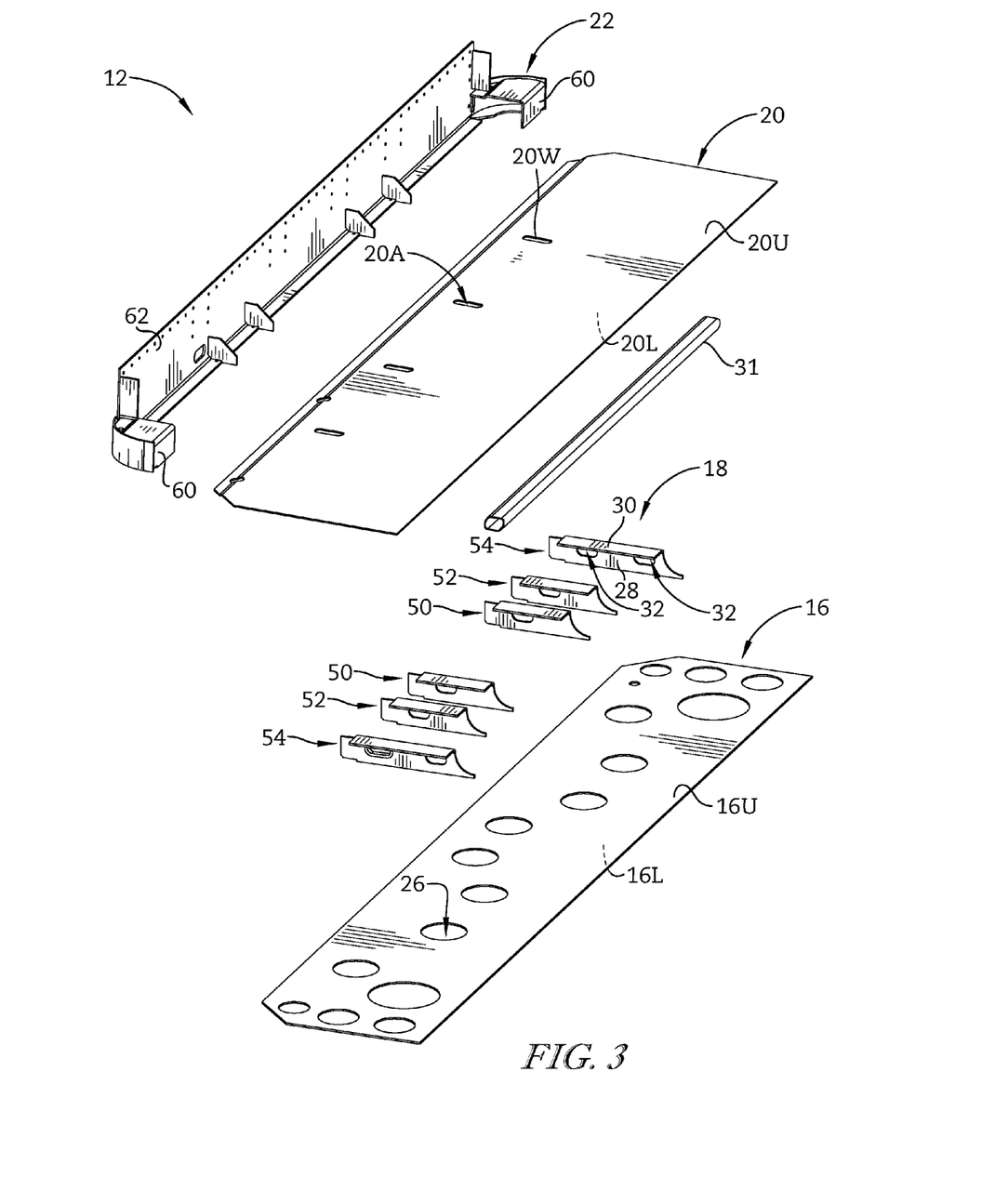
FIG. 3 is an exploded perspective view of the apron assembly included in the upper coupler assembly.

The illustrative apron assembly 12 generally comprises a bottom plate 16, a plurality of dividers 18, a floor plate 20, and a frame 22 as shown, from bottom to top, in FIG. 3. The bottom plate 16 is adapted to engage the fifth wheel coupling to cause the fifth wheel coupling to be aligned with the bottom plate 16 and the grid assembly 114. The dividers 18 support the bottom plate 16 and the floor plate 20 to allow the plates 16, 20 to support large loads. The floor plate 20 covers a top of the apron assembly 12 to support a load of cargo stored inside of the trailer 11 and to block access into an apron channel 24 formed between the bottom plate 16 and the floor plate 20. The frame 22 couples the apron assembly 12 to the forward section of the trailer 11. In some embodiments, the frame 22 is omitted from the apron assembly 12 and, instead, may be included in sub-assembly of the trailer.

In the illustrative embodiment, the apron assembly 12 further includes a conduit 31 that extends through the dividers 18 as shown in FIGS. 2 and 3. The conduit 31 is adapted to receive electrical wiring and fluid lines, direct the wiring and lines through the apron assembly 12, and block inadvertent damage to the wiring and lines.

The bottom plate 16 is adapted to cooperate with the frame 22 to strike the fifth wheel coupling to cause the fifth wheel coupling to pivot relative to the bottom plate 16 and engage the apron assembly 12. The bottom plate 16 is generally flat and typically occupies substantially an entire width of the trailer 11 as shown in FIGS. 2 and 3. However, it is within the scope of this disclosure to include an upper coupler assembly having a bottom plate of any suitable size. For example, an illustrative bottom plate 16 may measure about 34 inches long and about 102 inches or 8.5 feet wide. In the illustrative embodiment, the bottom plate 16 has a thickness between about one-tenth of an inch and about one-quarter of an inch.

The bottom plate 16 includes an upper surface 16U and a lower surface 16L as shown in FIG. 3. In the illustrative embodiment, the bottom plate 16 is formed to include a plurality of access ports 26 extending through the bottom plate 16 between the upper surface 16U and the lower surface 16L. In the illustrative embodiment, the access ports 26 are circular. In other embodiments, the access ports 26 may be elliptical, oval, rectangular, a distorted circular shape, or any other suitable shape.

The access ports 26 allow access into and out of the apron channel 24 through the bottom plate 16. The access ports 26 allow fluid such as, for example, rain water which inadvertently entered the apron channel 24 to drain through the access ports 26 and out of the bottom plate 16. These access ports 26 as well as other holes may be used to inspect the inner recesses of the apron channel 24, may serve as drain holes, and/or may be used to allow spray access to accomplish a spray galvanization and/or subsequent coating process.

The dividers 18 extend between and interconnect the bottom plate 16 and the floor plate 20 as shown in FIGS. 2-10. Each divider 18 extends from a front end of the apron assembly 12 toward a back end. The illustrative apron assembly 12 comprises six dividers 18. Each divider 18 is relatively thin compared to similar upper coupler dividers. In the illustrative embodiment, the dividers have a thickness in a range of about a tenth of an inch and about a quarter of an inch. In some embodiments, the dividers have a thickness of about a tenth of an inch. In the illustrative embodiment, the dividers 18 are generally parallel with one another.

Figure 6:
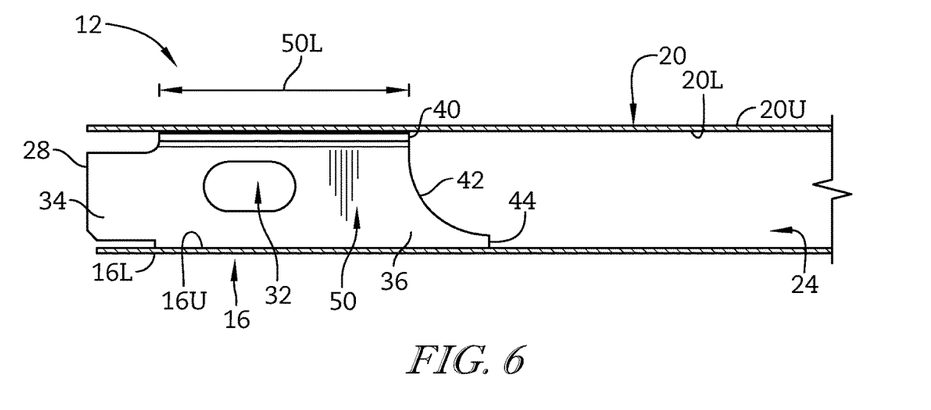
FIG. 6 is a cross-sectional view taken along line 6-6 of FIG. 4 showing a first divider having a first length.
Figure 7:
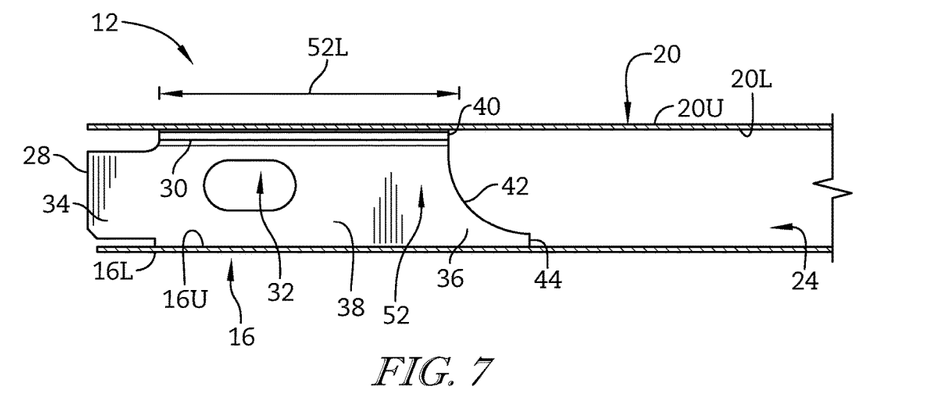
FIG. 7 is a cross-sectional view taken along line 7-7 of FIG. 4 showing a second divider having a second length that is greater than the first length.
Figure 8:
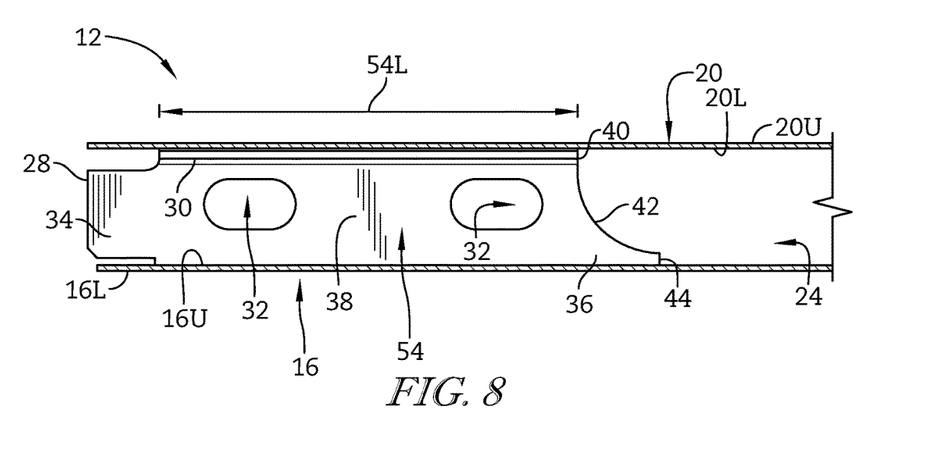
FIG. 8 is a cross-sectional view taken along line 8-8 of FIG. 4 showing a third divider having a third length that is greater than the first and the second lengths.

The dividers 18 each include an upright sidewall 28, an upper platform 30 extending away from the upright sidewall 28, and at least one divider aperture 32 extending through the upright sidewall 28 as shown in FIGS. 6-8. The upright sidewall 28 provides support between the bottom plate 16 and the floor plate 20. The upper platform 30 couples the divider 18 with the floor plate 20. The divider apertures 32 receive the conduit 31 to position and secure the electrical wiring and fluid lines through the dividers 18.

Figure 4:
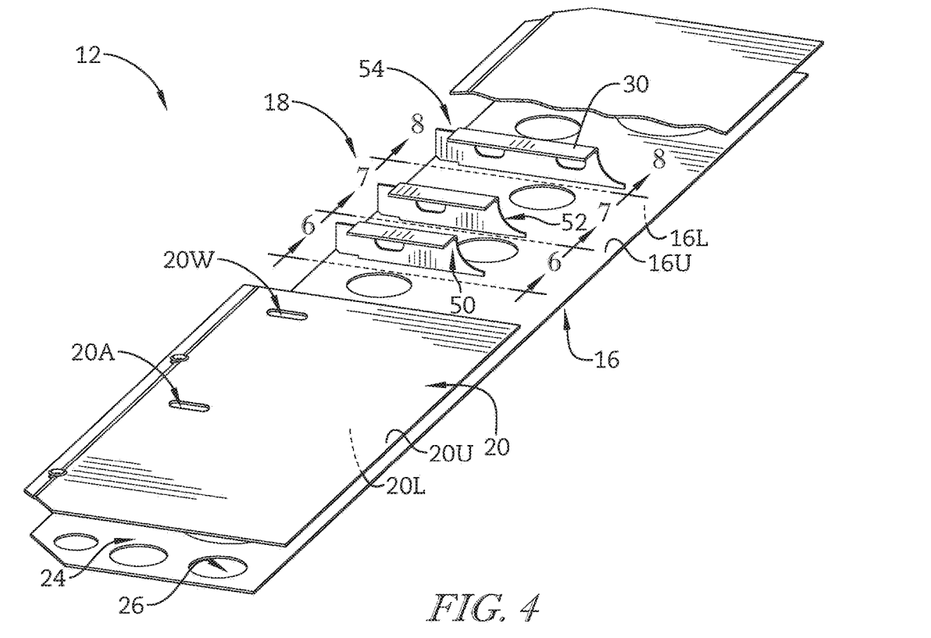
FIG. 4 is a cut-away view of the apron assembly showing that the apron assembly includes a plurality of dividers extending from the front of the apron assembly toward the back of the apron assembly.
Figure 10:
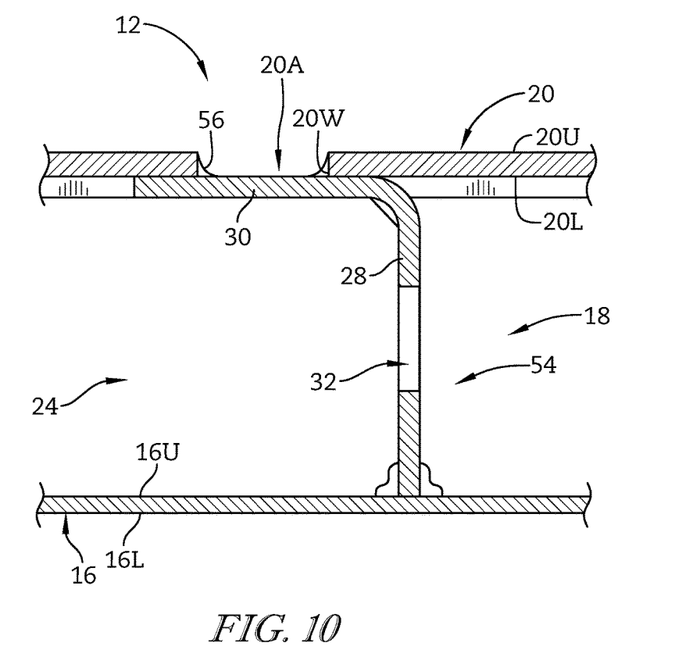
FIG. 10 is a cross-sectional view taken along line 10-10 of FIG. 9 showing a divider coupled with a bottom plate and a floor plate included in the apron assembly.

Each upright sidewall 28 is generally flat as shown in FIGS. 3 and 4. Illustratively, the upright sidewalls 28 are coupled with the bottom plate 16 as shown in FIG. 10. Each upright sidewall 28 includes a web section 34, a scallop section 36, and a support section 38 extending between the web section 34 and the scallop section 36 as shown in FIGS. 6-8. The web section 34 is spaced apart from the bottom plate 16 and couples the upright sidewall 28 with the frame 22. The scallop section 36 transmits and distributes a load between the floor plate 20 and the bottom plate 16 while minimizing a weight of the divider 18. The support section 38 extends between the upper platform 30 and the bottom plate 16 to transmit a load between the floor plate 20 and the bottom plate 16.

Figure 5:
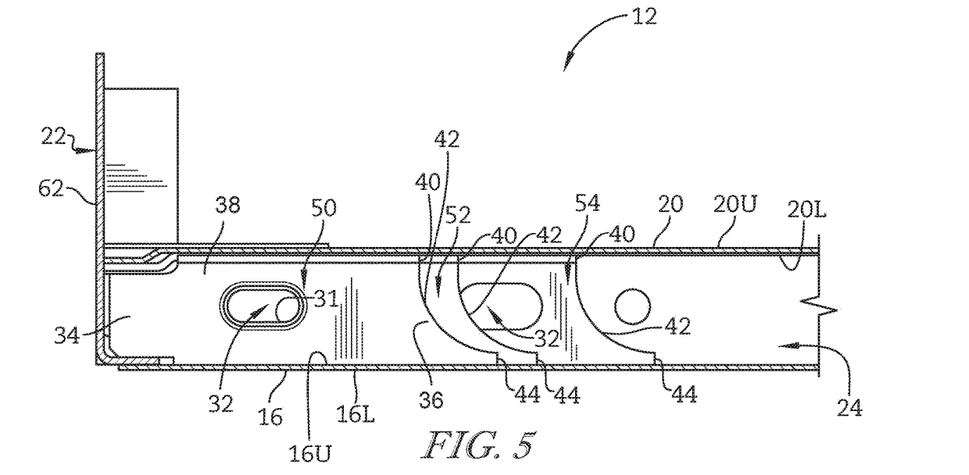
FIG. 5 is a cross-sectional view of the apron assembly of FIG. 4.

The support section 38 is generally flat and rectangular as shown in FIGS. 6-8. The support section 38 has a support height that extends between the upper platform 30 and the bottom plate 16. The web section 34 is coupled with and extends away from the support section 38 toward the front of the apron assembly 12. The web section 34 is spaced apart from the bottom plate 16 to locate a portion of the frame 22 between the web section 34 and the bottom plate 16 as shown in FIG. 5. The web section 34 has a web height that is smaller than the support height of the support section 38. In the illustrative embodiments, the web sections 34 are aligned with one another to form a line.

The scallop section 36 is coupled with and extends away from the support section 38 toward the back of the apron assembly 12 as shown in FIGS. 6-8. The scallop section 36 has a scallop height that is about equal to the support height. In the illustrative embodiment, the scallop section 36 may engage or contact the bottom plate 16, but the scallop section 36 is not coupled with the bottom plate 16. In other embodiments, the scallop section 36 is coupled with the bottom plate 16 as for example by welding. The scalloped section 36 minimizes stresses in the bottom plate 16. The scalloped section 36 extends fatigue life of the upper coupler assembly 10.

The scallop section 36 includes an upper surface 40, a scalloped surface 42, and a lower surface 44 as shown in FIGS. 6-8. The upper surface 40 extends between the upper platform 30 and the scalloped surface 42. In the illustrative embodiment, the upper surface 40 is generally vertical and about perpendicular with the floor plate 20. The scalloped surface 42 extends between the upper surface 40 and the lower surface 44. The lower surface 44 extends between the scalloped surface 42 and the bottom plate 16. In the illustrative embodiment, the lower surface 44 is generally vertical and about perpendicular with the bottom plate 16.

The scalloped surface 42 is curved in the illustrative embodiment. Illustratively, the curved scalloped surface 42 has a constant radius. In some embodiments, the curved scalloped surface 42 has a constant radius between about 1 inch and about 5 inches. In the illustrative embodiment, the curved scalloped surface 42 has a constant radius of about 2 inches. In other embodiments, the curved scalloped surface 42 has a varying radius. In other embodiments, the scalloped surface 42 is generally linear. In some embodiments, the dividers 18 have generally similar scalloped surfaces 42. In other embodiments, the dividers 18 have individually determined scalloped surfaces 42.

The upper platforms 30 is coupled with the support section 38 and extends away from the support section 38 toward a side of the trailer 11 as shown in FIG. 4. Illustratively, the upper platforms 30 are generally horizontal and parallel with the floor plate 20. The upper platforms 30 are continuous and generally flat. Each upper platform 30 is adapted to contact and/or engage the floor plate 20 along a portion of a face of the upper platform 30. As such, loads may be transmitted through the dividers 18 between the floor plate 20 and the bottom plate 16.

Each upright sidewall 28 is formed to include at least one divider aperture 32 as shown in FIGS. 3 and 4. The divider apertures 32 are formed in the support section 38 of each divider 18. The divider apertures 32 are sized to receive the conduit 31 to provide a passage for the electrical wiring and fluid lines to pass through the apron assembly 12. In some embodiments, the conduit 31 is omitted and the electrical wiring and fluid lines pass through the divider apertures 32 without the conduit 31. In the illustrative embodiment, a center of each divider aperture 32 is located about four inches from the front end of the web section 34. Some dividers 18 may include additional divider apertures 32 such as, for example, to reduce a weight of the upper coupler assembly 10.

In the illustrative embodiment, the divider apertures 32 are oval. In other embodiments, the divider apertures 32 are elliptical, circular, rectangular, oval shaped, a distorted circular shape, or any other suitable alternative. A major axis of each divider aperture 32 extends from the web section 34 of the divider 18 toward the scallop section 36. A minor axis of each divider aperture 32 extends from the bottom plate 16 toward the floor plate 20.

In the illustrative embodiment, the dividers 18 have varying lengths. Illustratively, the dividers 18 include first dividers 50, second dividers 52, and third dividers 54 as shown in FIGS. 3-9. The first dividers 50 include support sections 38 having a first length 50L as shown in FIG. 6. The second dividers 52 include support sections 38 having a second length 52L that is relatively larger than the first length 50L as shown in FIG. 7. The third dividers 54 include support sections 38 having a third length 54L that is relatively larger than the first length 50L and the second length 52L as shown in FIG. 8. As such, the second dividers 52 are longer than the first dividers 50 and the third dividers 54 are longer than the second dividers 52 as shown in FIGS. 5-8.

Figure 9:
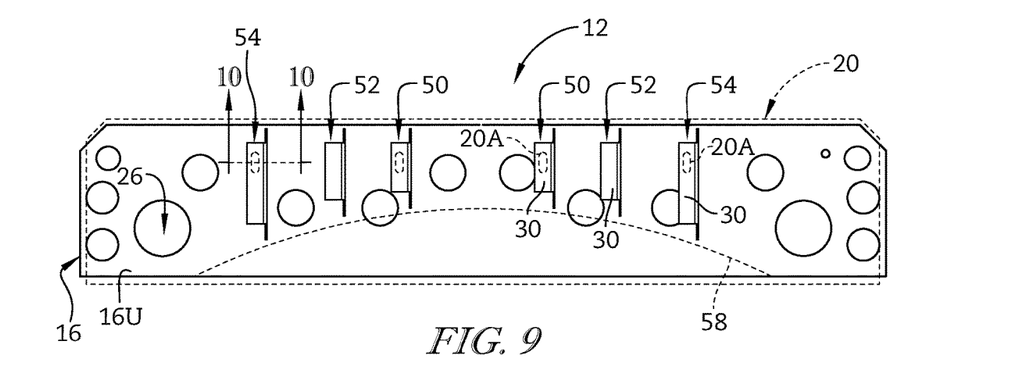
FIG. 9 is a top view of the upper coupler assembly of FIG. 4 showing that the ends of the dividers are arranged along a curved path.

In the illustrative embodiment, the dividers 18 include a pair of first dividers 50, a pair of second dividers 52, and a pair of third dividers 54 as shown in FIG. 9. The third dividers 54 are spaced apart from one another and located toward the sidewalls 70 of the trailer 11 as shown in FIG. 9. The first dividers 50 are spaced apart from the third dividers 54 toward a center of the apron assembly 12. The second dividers 52 are located between the first dividers 50 and the third dividers 54.

The ends of the dividers 18 are arranged along a curved path 58 as shown in FIG. 9. The curved path 58 provides support for the apron assembly 12 and distributes force loads when the apron assembly 12 strikes the fifth wheel coupling. The web sections 34 are located along the front of the apron assembly 12 and aligned with one another. Because the dividers 50, 52, 54 have varying lengths, the scallop sections 36 of the dividers 50, 52, 54 are located along the curved path 58 as shown in FIG. 10. In the illustrative embodiment, the curved path 58 has a constant radius. In some embodiments, the radius of the curved path 58 is between about two feet and about six feet. Illustratively, the radius of the curved path 58 is about five feet. In other embodiments, the curved path 58 has a varying radius.

Illustratively, the dividers 18 and the bottom plate 16 may be coupled together as for example by welding. The dividers 18 and the bottom plate 16 may also be coupled together with frame 22. The dividers 18 and the floor plate 20 may be coupled together as for example by welding.

The floor plate 20 provides a floor or subfloor for the trailer 11 and supports cargo stored inside of the trailer 11 as shown in FIG. 2. The floor plate 20 is coupled with the frame 22 and the dividers 18 to cover the apron channel 24. The floor plate 20 is generally flat and typically occupies substantially an entire width of the trailer 11 as shown in FIGS. 2 and 3. However, it is within the scope of this disclosure to include an upper coupler assembly having a floor plate of any suitable size. For example, an illustrative floor plate 20 may measure about 34 inches long and about 102 inches or 8.5 feet wide. In the illustrative embodiment, the floor plate 20 has a thickness between about one-tenth of an inch and about one-quarter of an inch.

The floor plate 20 includes an upper surface 20U, a lower surface 20L, and a plurality of sidewalls 20W formed to define a plurality of weld apertures 20A extending through the floor plate 20 between the upper surface 20U and the lower surface 20L as shown in FIG. 4. In the illustrative embodiment, the weld apertures 20A are oval. In other embodiments, the weld apertures may be elliptical, circular, or any other suitable shape. A major axis of each weld aperture 20A extends along the length of the floor plate 20. A minor axis of each weld aperture 20A extends along the width of the floor plate 20. In other embodiments, the weld apertures 20A may be circular, oval, rectangular, or any other suitable shape. The sidewalls 20W comprise a fillet weld 56 as shown in FIG. 10.

The lower surface 20L is supported by the upper platforms 30 of the dividers 18 as shown in FIGS. 4 and 10. A weld material is located in each weld aperture 20A to form fillet welds 56. Each fillet weld 56 couples the floor plate 20 with the corresponding divider 18. In the illustrative embodiment, the floor plate 20 includes four weld apertures 20A. A weld aperture 20A is aligned with each of the first and third dividers 50, 54. In other embodiments, the floor plate 20 may include a weld aperture 20A for each divider 18. In other embodiments, a weld material may be located in the weld aperture 20A to form a plug weld.

The frame 22 is coupled with the floor plate 20 and the bottom plate 16 around a perimeter of the apron assembly 12 to support a portion of the load applied to the apron assembly 12 as shown in FIG. 2. As shown in FIGS. 2, 3, and 5, the frame 22 illustratively includes a pair of corner supports 60 and a front plate 62. The corner supports 60 are spaced apart from each other and the front plate 62 extends between and interconnects an end of each of the corner supports 60. In the illustrative embodiment, the frame 22 is formed of steel. The components of the frame 22 may be attached together by welding. Alternate frame 22 configurations may also be used.

Figure 11:
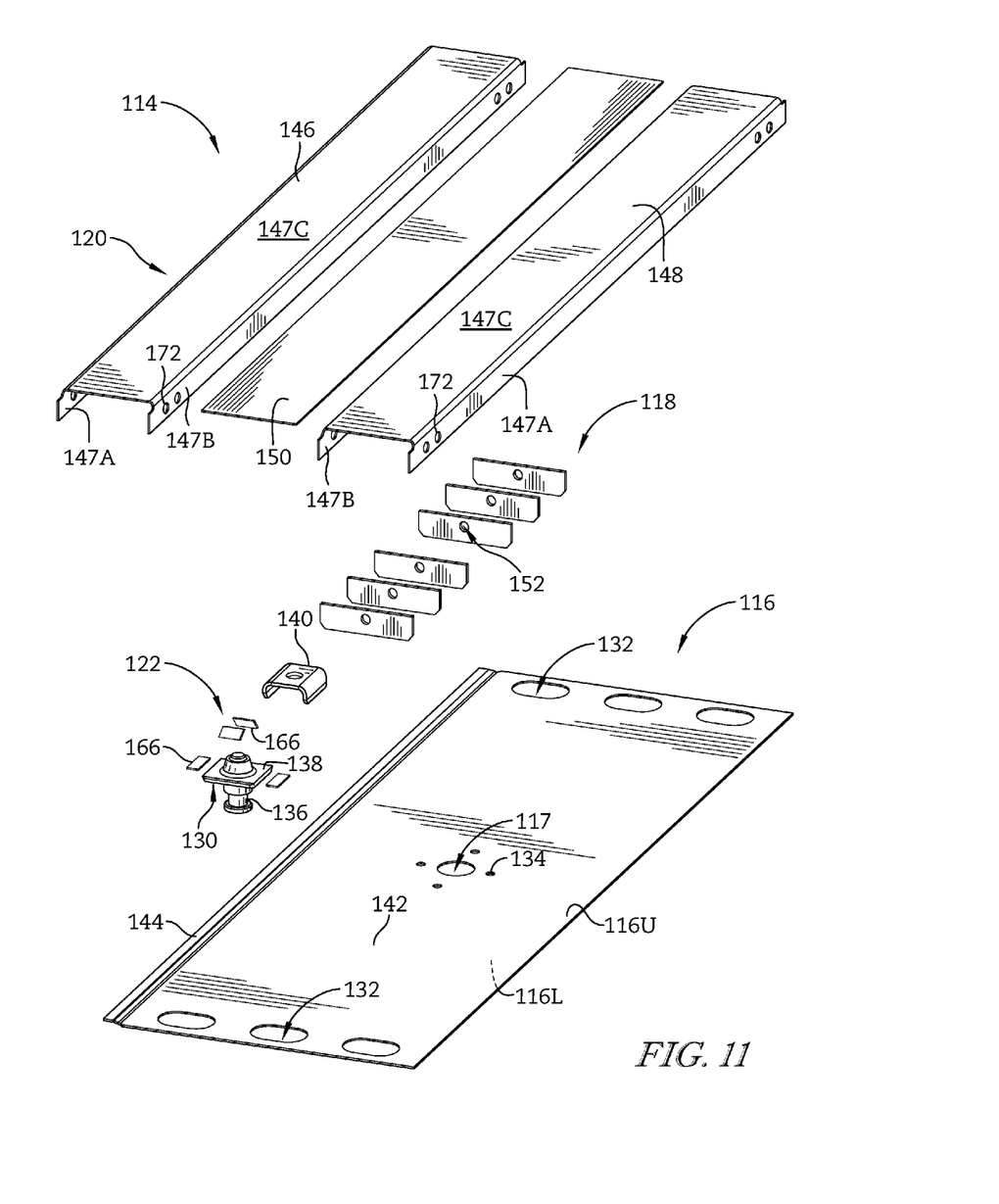
FIG. 11 is an exploded perspective view of the grid assembly included in the upper coupler assembly of FIG. 2.
Figure 14:
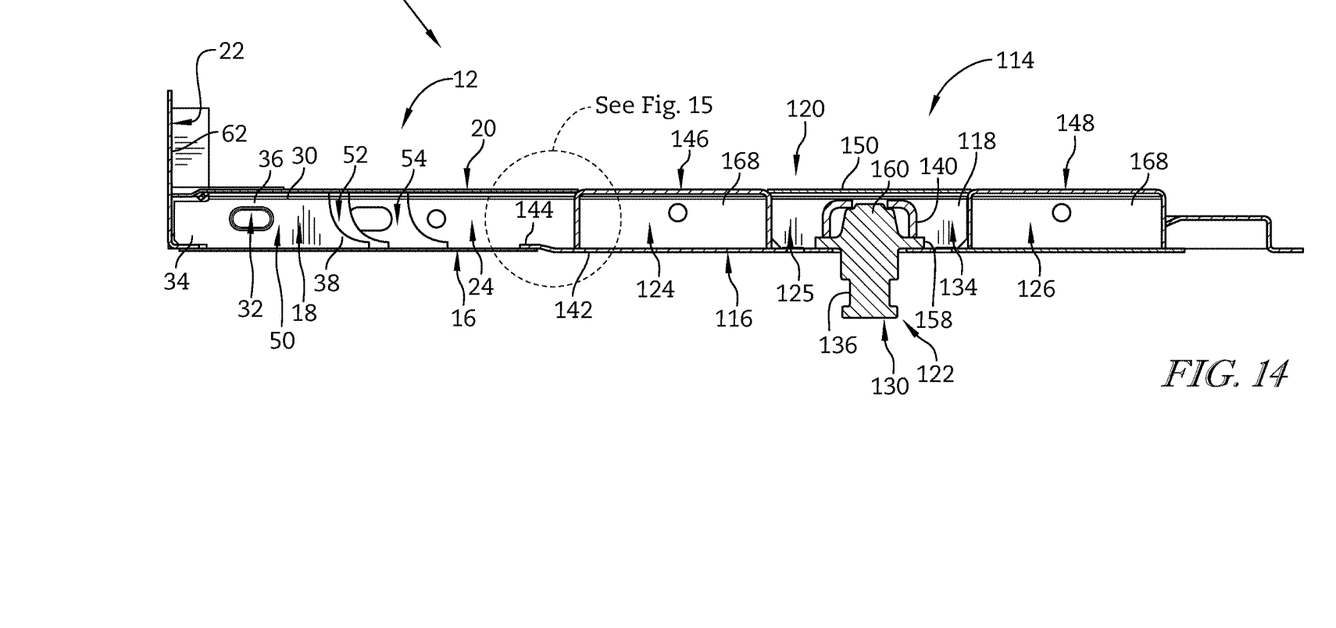
FIG. 14 is a cross-sectional view of the upper coupler assembly of FIG. 2.

Grid assembly 114 includes a grid plate 116, a kingpin assembly 122, a plurality of ribs 118, and a cover assembly 120 as shown, from bottom to top, in FIG. 11. The grid plate 116 forms a base of the upper coupler assembly 10 as shown in FIGS. 2 and 14. The kingpin assembly 122 is adapted to couple the trailer 11 with the fifth wheel coupling (not shown). The ribs 118 support the grid plate 116 and the cover assembly 120 to allow the grid plate 116 and the cover assembly 120 to support large loads. The cover assembly 120 covers a top of the grid assembly 114 to support the load of cargo stored inside of the trailer 11 and to block access into a number of channels 124, 125, 126 formed in the grid assembly 114.

Figure 12:
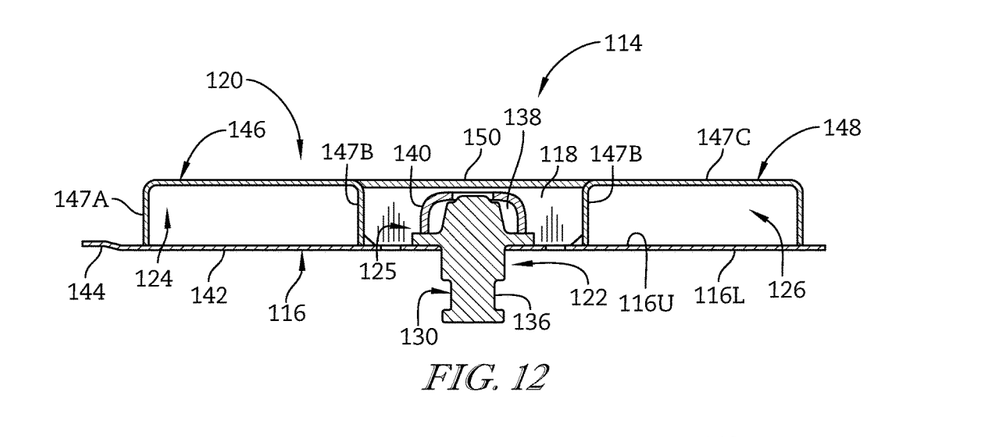
FIG. 12 is a cross-sectional view of the grid assembly.

The grid plate 116 includes a lower surface 116L and an upper surface 116U as shown in FIGS. 11 and 12. The lower surface 116L of the grid plate 116 illustratively is generally flush with a bottom surface of the sub-floor of the trailer 11. The grid plate 116 typically occupies substantially the entire width of the trailer 11. However, it is within the scope of this disclosure to include an upper coupler assembly having a grid plate of any suitable size. For example, an illustrative grid plate 116 may measure about 34 inches long and about 102 inches or 8.5 feet wide.

Figure 15:
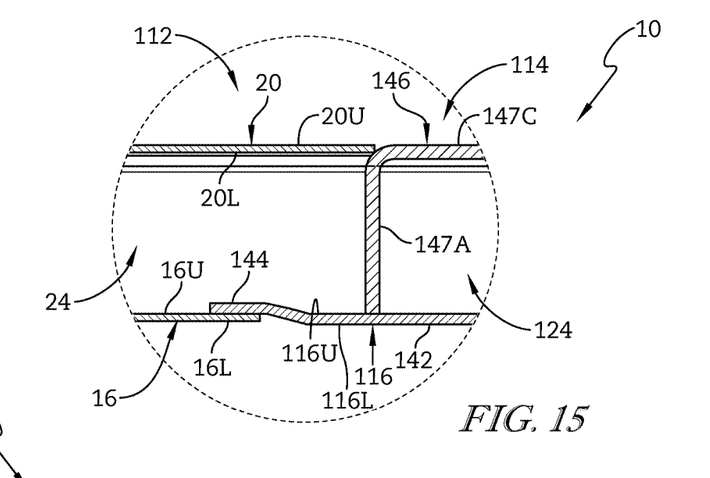
FIG. 15 is a view similar to FIG. 14 showing that a joggled lip of the grid assembly is positioned above the bottom plate included in the apron assembly.

The grid plate 116 includes a plate body 142 and a joggled lip 144 as shown in FIGS. 14 and 15. The lower surface 116L of the plate body 142 is generally flush with the lower surface 16L of the bottom plate 16 included in the apron assembly 12. The joggled lip 144 extends along a front of the plate body 142. The joggled lip 144 extends upwardly and away from the front of the plate body 142. The upper surface 16U of the bottom plate 16 engages the lower surface 116L of the joggled lip 144 as shown in FIG. 15. In the illustrative embodiment, a weld joint such as, for example, a fillet weld is formed along the joggled lip 144 to couple the grid plate 116 with the bottom plate 16.

Illustratively, the grid plate 116 may have a prepunched hole or aperture 117 defined therethrough and configured to receive therethrough the kingpin 130 included in the kingpin assembly 122 as shown in FIG. 11. In one illustrative embodiment, the kingpin 130 may include a groove that facilitates welding together the kingpin 130 and the grid plate 116.

Illustratively, access ports, cutouts or holes 132, as well as drain holes 134, may be defined in the grid plate 116 as shown in FIG. 11. These access ports 132, 134, as well as other holes may be used to inspect the inner recesses of the channels, may serve as drain holes, and/or may be used to allow spray access to accomplish the spray galvanization and/or subsequent coating process. The holes 132, 134 may be cut directly from the grid plate 116 during manufacturing of the upper coupler assembly 10 or may be independently formed of the same or a different metal or alloy, as the grid plate 116.

Illustratively, the access ports 132 are generally oval in shape and may be equipped with similarly shaped plugs the may be received in the ports 132. However, it is within the scope of this disclosure to include access ports and plugs of any suitable shape or size. For example, the access ports and plugs may be circular, rectangular, square-shaped, elliptical, oval, etc. Illustratively, the access plugs may be removably disposed in the ports 132, such that servicing of the upper coupler assembly 10 including applying new spray or injection coatings, servicing support block, and replacing/servicing zinc blocks 166, may be performed from beneath the trailer 11.

The grid plate 116 provides a support for the grid assembly 114. Illustratively, a plurality of cross-members 146, 148 included in the cover assembly 120, and, optionally, the plurality of dividers or ribs 118 are coupled with the grid plate 116. The ribs 118 may be coupled with the cross-members 146, 148.

The cover assembly 120 includes a front cross-member 146, a rear cross-member 148, and a main panel 150 as shown in FIG. 11. Referring to FIGS. 11-14, the plurality of cross-members 146, 148 may be mounted or coupled with the upper surface 116U of the grid plate 116. Each cross-member 146, 148 extends laterally across the width of trailer 11 and may be connected to the corner supports 60 on each side of the upper coupler assembly 10. The front and rear cross-members 146, 148 are each formed in the shape of an upside-down "U" when viewed from the end (as shown in FIG. 12) and each includes substantially flat or planar top and side walls and rounded corners.

Illustratively, as shown in FIGS. 2 and 12, a front channel 124 is formed between the grid plate 116 and the front cross-member 146, a rear channel 126 is formed between the grid plate 116 and the rear cross-member 148. The front cross-member 146 and the rear cross-member 148 are parallel to and spaced-apart from each other such that a main channel 125 is defined therebetween.

More specifically, as seen in FIG. 12, the front cross-member 146 and the rear cross-member 148 each include first and second spaced apart vertical or side walls 147A, 147B and a third horizontal or top wall 147C. The first and second walls 147A, 147B are attached to and extend upwardly from the grid plate 116, such that the first and second walls 147A, 147B are generally perpendicular to the grid plate 116. The horizontal or top wall 147C connects the first and second walls 147A, 147B at the top ends thereof, which illustratively are but need not be rounded.

The sidewalls 147 are formed to include apertures 172 that extend through the sidewalls 147. The apertures 172 are arranged to receive conduit 170 that extends through the cross-members 146, 148 as shown in FIG. 2. The conduit 170 is adapted to receive electrical wiring and fluid lines, direct the wiring and lines through the grid assembly 114, and block inadvertent damage to the wiring and lines. In the illustrative embodiment, the apertures 172 are circular. In other embodiments, the apertures may be elliptical, oval, rectangular, or any other suitable shape.

The cross-members 146, 148 may comprise a unitary or monolithic structure, or they may comprise separate components 147A, 147B, 147C that are connected or coupled together, for example by welding. Illustratively, respective sidewalls 147B of each cross-member 146, 148 are spaced apart from each other in order to define, along with grid plate 116, the generally U-shaped main channel 125 therebetween. The aperture 117 in the grid plate 116 is positioned entirely between the walls 147B. Illustratively, a reinforcement channel 140 may be positioned between the respective cross-members 146, 148 as bounded by a respective side wall 147B of each of the cross-members 146, 148. Additional cross-members may be provided if desired.

Welding together the cross-members 146, 148 and the grid plate 116 defines the channel(s) or interior portion(s) 124, 125, 126. The cross-members 146, 148 may also be coupled together with the frame 22.

The main panel 150 extends between the front cross-member 146 and the rear cross-member 148 to block access into the main channel 125. Main panel 150 illustratively is shaped to fit and extend over the main channel 125. For example, in one illustrative embodiment, main panel 150 is approximately 10 inches long and approximately 102 inches wide, as are top flat faces or walls 147C of each cross member 146, 148. The main panel 150 may be disposed or placed to cover the main channel 125 and may be coupled with the corner supports 60, as for example by welding or other suitable means.

The ribs 118 of the grid assembly 114 illustratively are positioned between the cross-members 146, 148 on either side of the kingpin assembly 122, as shown in FIG. 2. Illustratively, the ribs 118 are vertical plates secured to the grid plate 116, the cross members 146, 148, and the main panel 150. The ribs 118 illustratively conform to the shape of the main channel 125 and span the distance between the walls 147B.

Illustratively, because the ribs 118 span the height of flooring region, the ribs 118 form substantially enclosed chambers between a set of ribs 118 or between a rib 118 and the reinforcement channel 140. Illustratively, the ribs 118 are each welded with the grid plate 116 and the cross members 146, 148; however, it is within the scope of this disclosure to couple the ribs 118 to the grid plate 116 and cross-members 146, 148 by any other suitable coupling structure. Illustratively, the area bounded by the bolster walls 147B and the first pair of ribs 118 proximate to either side of the kingpin aperture 117, in other words adjacent to respective arm portions 162, may be referred to as the kingpin box.

Illustratively, each rib 118 is formed to include a rib aperture 152 that extends through the rib 118 as shown in FIG. 11. The illustrative rib apertures 152 are formed in a midsection of the ribs 118.

Figure 13:
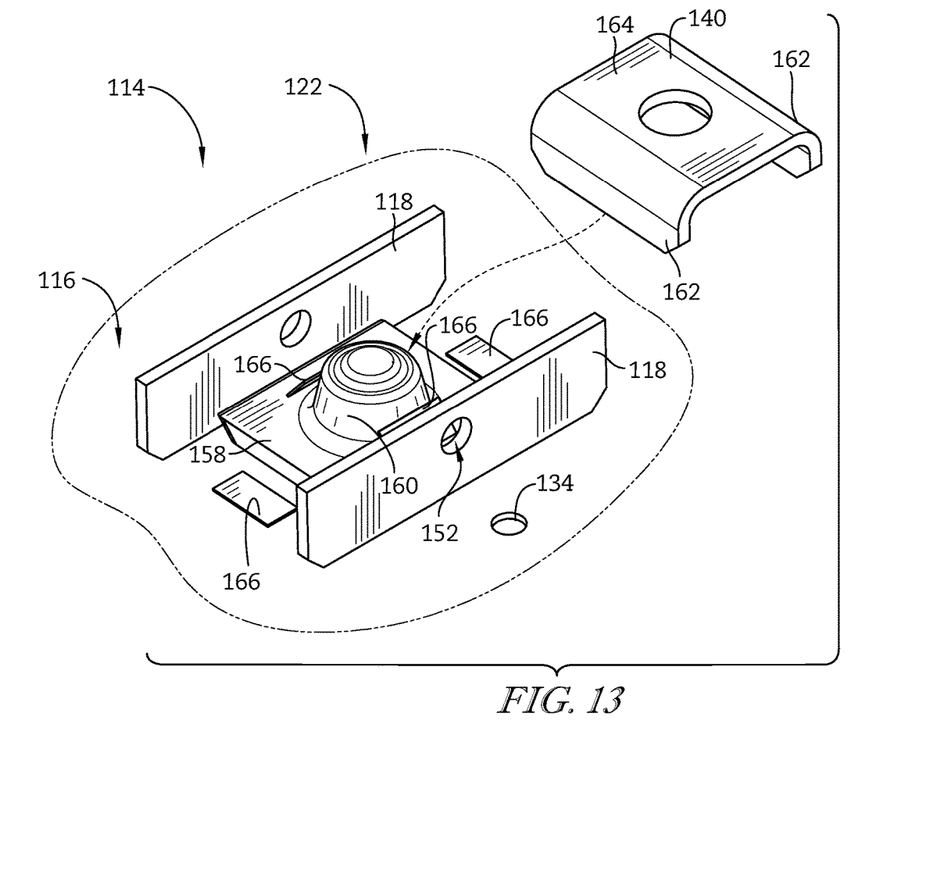
FIG. 13 is a perspective view of a kingpin assembly included in the grid assembly.

Referring to FIGS. 11-13, the illustrative kingpin assembly 122 includes the kingpin 130 coupled with the reinforcement channel 140. The kingpin 130 is positioned to extend downwardly from the grid plate 116. The kingpin 130 includes a lower portion 136 and an upper portion 138 as shown in FIGS. 12 and 13.

The lower portion 136 of the kingpin 130 is received through the aperture 117 in the grid plate 116 and is illustratively located approximately 36 inches rearward of a front end of the trailer 11 as shown in FIGS. 12 and 14. The lower portion 136 comprises a spool 136 that projects from the underside of the grid plate 116 and is positioned to engage a tractor's fifth wheel or lower coupler (not shown) or it may interface with a stanchion plate (not shown) of a railway car, for example. Illustratively, the spool 136 is relatively shorter than existing spools to cause the spool 136 to extend downwardly away from the grid plate 116 a desired amount to compensate for the relatively thin grid plate 116.

The upper portion 138 of kingpin 130 is secured with the grid plate 116 and with the reinforcement channel 140. The upper portion 138 includes a platform 158 coupled with the grid plate 116 and an upper hub 160 that extends upwardly away from the platform 158 and is coupled with the reinforcement channel 140. The lower portion 136 extends downwardly away from the platform 158.

Looking now to FIG. 13, the illustrative reinforcement channel 140 is disposed in the space between the cross members 146, 148. Illustratively, the reinforcement channel 140 includes spaced-apart side arm portions 162 and a bridge portion 164 extending between and coupled with the side arm portions 162. In particular, the bridge portion 164 is coupled with an upper end of each side arm portion 162 while a lower end of each side arm portion 162 is coupled with the platform 158 of the kingpin 130. As such, the bridge portion 164 of the reinforcement channel 140 is spaced-apart from the grid plate 116.

Illustratively, the reinforcement channel 140 is welded to the platform 158 along the side arm portions 162; however, it is within the scope of this disclosure to couple the reinforcement channel 140 with the platform 158 by any other coupling structure. The open ends of the reinforcement channel 140 are coupled to the ribs 118 positioned on both sides of the reinforcement channel 140 to close the reinforcement channel 140. In the illustrative embodiment, each end of the reinforcement channel 140 is welded to one of the ribs 118.

Illustratively, components of the upper coupler assembly 10 including the apron assembly 12 and the grid assembly 114 are made of metal and/or metallic alloys, such as steel, which have high strength and durability. As noted above, these components are welded to each other at their connections. However, it is within the scope of this disclosure to couple the components of the upper coupler assembly 10 with each other using other suitable fastening structures such as bolts, screws, rivets, epoxy, adhesives etc.

Illustratively, while various components of the upper coupler assembly 10 are shown in FIGS. 1-14, it is within the scope of this disclosure to include alternative upper coupler assemblies having other suitable components coupled with a trailer to permit the trailer to be coupled with a semi-truck, for example. For example, other embodiments may include stiffeners 168 spanning the front and rear channels 124, 126 as shown in FIG. 14.

The upper coupler assembly 10 illustratively includes anodes 166 as shown in FIGS. 11 and 13. It will be appreciated that anodes 166 are illustrative only and are not necessary. Illustratively, the anodes 166 comprise zinc blocks attached to the grid plate 116 adjacent the reinforcement channel 140 and the kingpin 130. Illustratively, the zinc blocks operate as sacrificial anodes to retard (e.g., delay) or even stop the corrosion of the surrounding steel components of the upper coupler assembly 10.

Illustratively, the sacrificial anodes 166 include a metal having a more negative electrochemical reduction potential than any of the metal(s) used to form the surrounding components of the upper coupler assembly 10 and the metal(s) used to weld the components of upper coupler assembly 10 together. Stated differently, sacrificial anodes 166, such as the illustrative zinc blocks 166, include a metal that will oxidize more readily than any the metal(s) used in the components, fasteners, and/or welding adjacent to and surrounding the sacrificial anodes 166.

Further illustratively, while the sacrificial anodes 166 of the trailer coupler assembly are zinc, it is within the scope of this disclosure to substitute or include other suitable metals that oxidize more readily than the metal(s) used to form the various components of the upper coupler assembly 10. Examples include, but are not limited to, magnesium, aluminum, and alloys of zinc, magnesium, and aluminum. Furthermore, while the entirety of the sacrificial anodes 166 are generally formed of zinc, it is within the scope of this disclosure to include sacrificial anodes which are only partially formed of one or more of the aforementioned or other suitable metals.

The main channel 125 of the upper coupler assembly 10 may be galvanized or coated, for example by thermal spraying. Illustratively, the entire length and width of, including all upstanding cross-member side walls 147B, corner supports 60, and ribs 118 defining or disposed within the channel 125 may be sprayed, galvanized or coated.

By galvanizing selected areas, the illustrative method saves weight and expense. Illustratively, this further coating may be an injection coating and, for example and without limitation, a wax coating, an epoxy paint, or a water emulsified asphaltic coating. For example, the wax-based coating may be applied to the underbody, including for example the outer facing surfaces of the bottom plate 16 and the grid plate 116. In addition, the wax-based coating may be injected into the various channels 24, 124, 125, 126 of the upper coupler assembly 10 for example through a high-pressure wand inserted into holes 132 and/or holes on the weld reinforcements. While this injection coating will protect the portions that have not been galvanized, it may also mix with the particles of the spray coating from spraying step that did not get fully fused to the assembly metal, for example zinc particles, which particles will be retained and will serve as further sacrificial material to further protect the galvanized areas.

Illustratively, the trailer 11 is a box or van-type trailer including sidewalls 70, a roof 72 coupled with the sidewalls, and doors (not shown) provided in one or more of the sidewalls 70. In one illustrative embodiment, the upper coupler assembly 10 illustratively may include a sacrificial element, for example anodes 166, provided to retard the corrosion of other surrounding components of the upper coupler assembly 10.

The upper coupler assembly 10 is coupled with the trailer 11 such that the trailer 11 may be connected to a semi-tractor (not shown) or other suitable vehicle. Illustratively, the upper coupler assembly 10 is provided in and coupled with a floor region of the trailer 11 and is located near the front section of the trailer 11. In particular, the trailer 11 includes a floor having a sub-floor and a flooring surface to define the floor region of the trailer 11 therebetween. Illustratively, such flooring surface is removed from the trailer 11 in order to access the interior of the floor region.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An upper coupler assembly for use with a trailer, the upper coupler assembly comprising:
an apron assembly including a substantially horizontal bottom plate configured to engage a coupling of a vehicle, a floor plate spaced apart from the bottom plate, and a plurality of dividers coupled with the bottom plate and coupled with the floor plate to support the floor plate above the bottom plate, and
wherein each of the plurality of dividers includes an upright sidewall extending away from the bottom plate toward the floor plate, each upright sidewall includes a web section, a scalloped section, and a support section extending between the web section and the scalloped section, the dividers being positioned to cause the web sections to be aligned with one another along a straight path, and the support sections of the plurality of dividers have varying lengths to cause the scalloped sections of the dividers to be arranged along a curved path.

2. The upper coupler assembly of claim 1, wherein each scalloped section includes a substantially vertical upper surface, a substantially vertical lower surface, and a curved scalloped surface extending between the upper surface and the lower surface.

3. The upper coupler assembly of claim 2, wherein the curved scalloped surface has a constant radius of curvature.

4. The upper coupler assembly of claim 3, wherein the radius of curvature of the curved scalloped surface is between about one inch and about five inches.

5. The upper coupler assembly claim 1, wherein the support section is coupled with the bottom plate and the scalloped section is engaged with the bottom plate without being directly coupled with the bottom plate.

6. The upper coupler assembly of claim 1, wherein each support section is formed to include at least one oval divider aperture that extends through the support section and the divider apertures are formed in the dividers to cause the oval divider apertures in each of the plurality of dividers to be aligned with one another.

7. The upper coupler assembly of claim 1, further including a frame having a front plate, wherein the web section of each upright sidewall is coupled to the front plate of the frame.

8. An upper coupler assembly for use with a trailer, the upper coupler assembly comprising:
an apron assembly including a bottom plate, a floor plate spaced apart from the bottom plate, and a plurality of dividers coupled with the bottom plate and coupled with the floor plate, and
wherein each of the plurality of dividers includes an upright sidewall extending away from the bottom plate toward the floor plate, each upright sidewall includes a first end and a second end spaced apart from the first end, the first ends of the dividers aligned with one another along a straight path, and the plurality of dividers have varying lengths to cause the second ends of the dividers to be arranged along a curved path.

9. The upper coupler assembly of claim 8, wherein the plurality of dividers includes a pair of first dividers having a first length, a pair of second dividers having a second length greater than the first length, and a pair of third dividers having a third length greater than the second length.

10. The upper coupler assembly of claim 9, wherein the each of the pair of first dividers is spaced apart from one another, each of the pair of second dividers is spaced apart from one another, and each of the pair of third dividers is spaced apart from one another, wherein each of the pair of second dividers is located between the pair of third dividers and each of the pair of first dividers is located between the pair of second dividers.

11. The upper coupler assembly of claim 8, wherein the curved path has a constant radius of curvature.

12. The upper coupler assembly of claim 11, wherein the curved path has a radius between about two feet and about six feet.

13. The upper coupler assembly of claim 8, wherein the floor plate includes a lower surface facing the dividers, an upper surface spaced apart from the lower surface, and a plurality of sidewalls extending between the upper surface and the lower surface to form a plurality of weld apertures and each of the weld apertures is aligned with a corresponding one of the dividers.

14. The upper coupler assembly of claim 13, wherein each weld aperture is one of an oval, elliptical, or circular shape.

15. The upper coupler assembly of claim 13, wherein each divider includes the upright sidewall coupled to the bottom plate and an upper platform extending away substantially perpendicularly from the upright sidewall and the upper coupler assembly further includes weld material located in each of the weld apertures to form fillet welds between the floor plate and the upper platform of the dividers to couple the floor plate with the plurality of dividers.

16. An upper coupler assembly for use with a trailer, the upper coupler assembly comprising:
an apron assembly including a substantially horizontal bottom plate, a floor plate spaced apart from the bottom plate, and a plurality of dividers coupled with the bottom plate and coupled with the floor plate to support the floor plate above the bottom plate, and
a grid assembly including a grid plate, a cover assembly coupled to the grid plate and including (i) a U-shaped front cross-member located toward the apron assembly, (ii) a U-shaped rear cross-member spaced apart from the U-shaped front cross-member to define a main channel between the U-shaped front cross-member and the U-shaped rear cross-member, and (iii) a main panel extending between the U-shaped front cross-member and the U-shaped rear cross-member to close the main channel, a kingpin assembly positioned in the main channel and coupled to the grid plate, and a plurality of ribs positioned in the main channel, each rib extending between the U-shaped front cross-member and the U-shaped rear cross-member.

17. The upper coupler assembly of claim 16, wherein the kingpin assembly includes a platform, a kingpin spool extending downwardly from the platform through the grid plate, and a downwardly-opening reinforcement channel support coupled to the platform, the reinforcement channel support including a first side arm coupled to the platform along a length of the reinforcement channel support, a second side arm coupled to the platform along the length of the reinforcement channel support, a first end coupled to one of the ribs positioned in the main channel, and a second end spaced apart from the first end along the length of the reinforcement channel support and coupled to one of the ribs positioned in the main channel support.

18. The upper coupler assembly of claim 16, wherein each rib is formed to include a rib aperture that extends through the rib and each rib aperture is formed in a midsection of each rib such that the rib apertures to be aligned with one another.

19. The upper coupler assembly of claim 16, wherein the grid plate includes a plate body and a joggled lip that extends away from the plate body toward the bottom plate of the apron assembly and the joggled lip overlaps the bottom plate of the apron assembly to cause the plate body to be generally aligned horizontally with the bottom plate of the apron assembly.

20. The upper coupler assembly of claim 16, wherein each of the plurality of dividers includes an upright sidewall extending away from the bottom plate toward the floor plate, each upright sidewall includes a first end and a second end spaced apart from the first end, the first ends of the dividers aligned with one another along a straight path, and the plurality of dividers have varying lengths to cause the second ends of the dividers to be arranged along a curved path.

\* \* \* \* \*

UNITED STATES PATENT AND TRADEMARK OFFICE
CERTIFICATE OF CORRECTION

PATENT NO. : 9,834,264 B2
APPLICATION NO. : 14/975012
DATED : December 5, 2017
INVENTOR(S) : Andrzej Wylezinski It is certified that error appears in the above-identified patent and that said Letters Patent is hereby corrected as shown below:

In the Specification

Column 13, Line 58, "zinc blocks 166," should be --zinc blocks,--.

Signed and Sealed this
Fifteenth Day of May, 2018

Andrei Iancu
*Director of the United States Patent and Trademark Office*